United States Patent
Bian et al.

(10) Patent No.: US 6,721,881 B1
(45) Date of Patent: Apr. 13, 2004

(54) SYSTEM AND METHOD FOR DETERMINING IF A DISPLAY DEVICE CONFIGURATION HAS CHANGED BY COMPARING A CURRENT INDICATOR WITH A PREVIOUSLY SAVED INDICATOR

(75) Inventors: Buming Bian, Austin, TX (US); Gary D. Huber, Austin, TX (US); Joe Curley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 531 days.

(21) Appl. No.: 09/676,745

(22) Filed: Sep. 29, 2000

(51) Int. Cl.[7] ................................................. G06F 9/00
(52) U.S. Cl. ................................. 713/1; 713/2; 710/104
(58) Field of Search .......................... 713/1, 2; 710/104

(56) References Cited

U.S. PATENT DOCUMENTS

| | | | |
|---|---|---|---|
| 5,036,481 A | | 7/1991 | Lunsford et al. ............ 364/708 |
| 5,325,532 A | * | 6/1994 | Crosswy et al. ................ 713/2 |
| 5,448,697 A | | 9/1995 | Parks et al. .................. 395/162 |
| 5,483,260 A | | 1/1996 | Parks et al. .................. 345/156 |
| 5,513,319 A | | 4/1996 | Finch et al. ............. 395/185.08 |
| 5,530,946 A | | 6/1996 | Bouvier et al. ......... 395/182.21 |
| 5,872,967 A | | 2/1999 | DeRoo et al. ............... 395/652 |
| 5,938,764 A | | 8/1999 | Klein ............................. 713/1 |
| 5,978,913 A | | 11/1999 | Broyles et al. ................ 713/2 |
| 6,098,158 A | | 8/2000 | Lay et al. .................... 711/162 |
| 6,219,451 B1 | | 4/2001 | Hunt et al. ................... 382/214 |
| 6,240,511 B1 | * | 5/2001 | Blumenau et al. ............. 713/1 |
| 6,356,965 B1 | * | 3/2002 | Broyles et al. ............. 710/104 |
| 6,434,696 B1 | * | 8/2002 | Kang ............................. 713/2 |
| 6,519,698 B1 | * | 2/2003 | Leyda et al. .................... 713/2 |

FOREIGN PATENT DOCUMENTS

JP 2000207165 A * 7/2000 ........... G06F/3/153

OTHER PUBLICATIONS

IBM, Fast DOS Soft Boot, Feb. 1, 1994, vol. 37, issue 2B pp. 185–186.*
Farzad Khosrowpour; *Original Equipment Manufacturer Identification For Configurable Electronic Hardware*; Filed Jan. 21, 1997; US Ser. No.: 08/786,007; 19 pages of Specification (including claims & abstract); and 4 sheets of figures. (Copy Enclosed).
William F. Sauber; *Video Monitor Multiplexing Circuit*; Filed Sep. 17, 1998; US Ser. No.: 09/156,085; 14 pages of Specification (including claims & abstract); and 7 sheets of figures. (Copy Enclosed).
Luke L. Chang and Joe E. Goodart; Dual–Input Monitor Identification Scheme; Filed Jan. 25, 2000; US Ser. No.: 09/491,072; 23 pages of Specification (including claims & abstract); and 4 sheets of figures. (Copy Enclosed).

* cited by examiner

*Primary Examiner*—Thomas Lee
*Assistant Examiner*—Mark Connolly
(74) *Attorney, Agent, or Firm*—Baker Botts L.L.P.

(57) ABSTRACT

The present invention speeds display device detection during system boot by utilizing the simple boot flag register and an additional indicator to determine the display device configuration detected during the previous system boot. If the display configuration has changed since the previous boot, then the changes are noted and, when appropriate, recorded for use during subsequent boots. If the configuration has not changed, then the display device configuration from the previous boot is still accurate, and it is therefore not necessary to query each output port during the current system boot.

16 Claims, 3 Drawing Sheets

SYSTEM AND METHOD FOR DETERMINING IF A DISPLAY DEVICE CONFIGURATION HAS CHANGED BY COMPARING A CURRENT INDICATOR WITH A PREVIOUSLY SAVED INDICATOR

BACKGROUND OF THE INVENTION

1. Field of the Invention

This invention relates generally to computer systems and, more particularly, to a method and system for quickly detecting display device configuration during system boot.

2. Description of the Related Art

Version 1.0 of the Simple Boot Flag Specification ("SBF Spec") by Microsoft, which is incorporated herein by reference in its entirety, provides for a simplified system boot process that does not run diagnostics unless a problem is known to exist. The SBF Spec provides for a boot register that resides in complementary metal oxide semiconductor ("CMOS") memory and whose location is indicated by a boot table. The operating system writes to this boot register to set options for subsequent system boots. The computer system's BASIC Input/Output System ("BIOS"), and the BIOS on any expansion cards, detect, by evaluating the contents of the boot register, whether diagnostics need to be executed during the next boot.

A video BIOS, associated with a video card, is also executed during the boot process. The video BIOS provides a set of video-related functions that provide an interface from the rest of the computer system to the video hardware. The video BIOS provides a low-level software interface to the video chipset in the same manner that the system BIOS provides an interface to the computer system chipset.

Regarding the SBF scheme for the system BIOS, the boot register resides in CMOS memory and provides a mechanism for the operating system to communicate back to the BIOS about what actions need to be taken on the next system boot. Specifically, the boot register contains a diagnostics bit, DIAG. The contents of the DIAG bit indicate to the system BIOS whether or not Power On Self Test (POST) diagnostics should be run during system boot-up. The DIAG bit is set either by the BIOS itself or by the operating system. If set by the operating system, the DIAG bit is set during one system boot to indicate to the BIOS that diagnostics should be run during the next system boot. If the DIAG bit is not set, then the BIOS should not run a full suite of diagnostic routines but should instead run a much simpler system boot routine, referred to herein as a simple boot routine, in order to boot the computer system as quickly as possible.

One area of the system boot process that continues to cause a significant boot time delay is the detection of display devices. Even with the SBF implementation to speed a system boot, a video BIOS's detection of the display device(s) connected to the computer system can be complicated and, therefore, time-consuming. Many computer systems have multiple types of display devices attached to the system. In addition, between system boots, the user may have changed the default display monitor or may have connected a different type of display monitor. For instance, the output connectors for a computer system may include a DB-15 connector that is coupled to a traditional analog monitor, a DVI (Digital Visual Interface) connector that is coupled to digital flat panel display, and/or a television connector, such as a NTSC (National Television Standards Committee) or PAL (Phase Alternating Line) connector, coupled to a television output device. If, during a system boot, the computer system serially polls its connectors to detect each of the three types of display devices, the video BIOS POST time is of an undesirably long duration. What is needed is a method and apparatus that allows the video BIOS to quickly detect the computer system's display device configuration. In addition, it would be desirable if the method and apparatus could utilize already-existing indicators, such as those in the boot flag register.

SUMMARY OF THE INVENTION

The present invention speeds display device detection during a simple boot by utilizing the simple boot flag register and an additional indicator to determine the display device configuration detected during the previous system boot. If the display configuration has changed since the previous boot, then the changes are noted and, when appropriate, recorded for use during subsequent boots. If the configuration has not changed, then the display device configuration from the previous boot is still accurate, and it is therefore not necessary to query each output port during the current system boot.

In at least one embodiment, a method of detecting the display device configuration in a computer system comprises determining whether a previous system boot was successful. If the previous system boot was successful, then an indicator is accessed to determine the previous display device configuration that was recorded during the previous boot. The method includes determining whether the previous display device configuration has been modified, and includes modifying the indicator to reflect a current display device configuration if the previous display device configuration has been modified.

In at least one embodiment, a computer system provides a processor and a memory coupled to the processor. The system includes a module that determines whether a previous system boot was successful, a module that accesses an indicator to determine a previous display device configuration, if the previous system boot was successful, a module that determines whether the previous display device configuration has been modified, and a module that modifies the indicator to reflect a current display device configuration if the previous display device configuration has been modified.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of a mode for carrying out the invention. The description is intended to be illustrative of the invention and should not be taken to be limiting.

Figure 1:
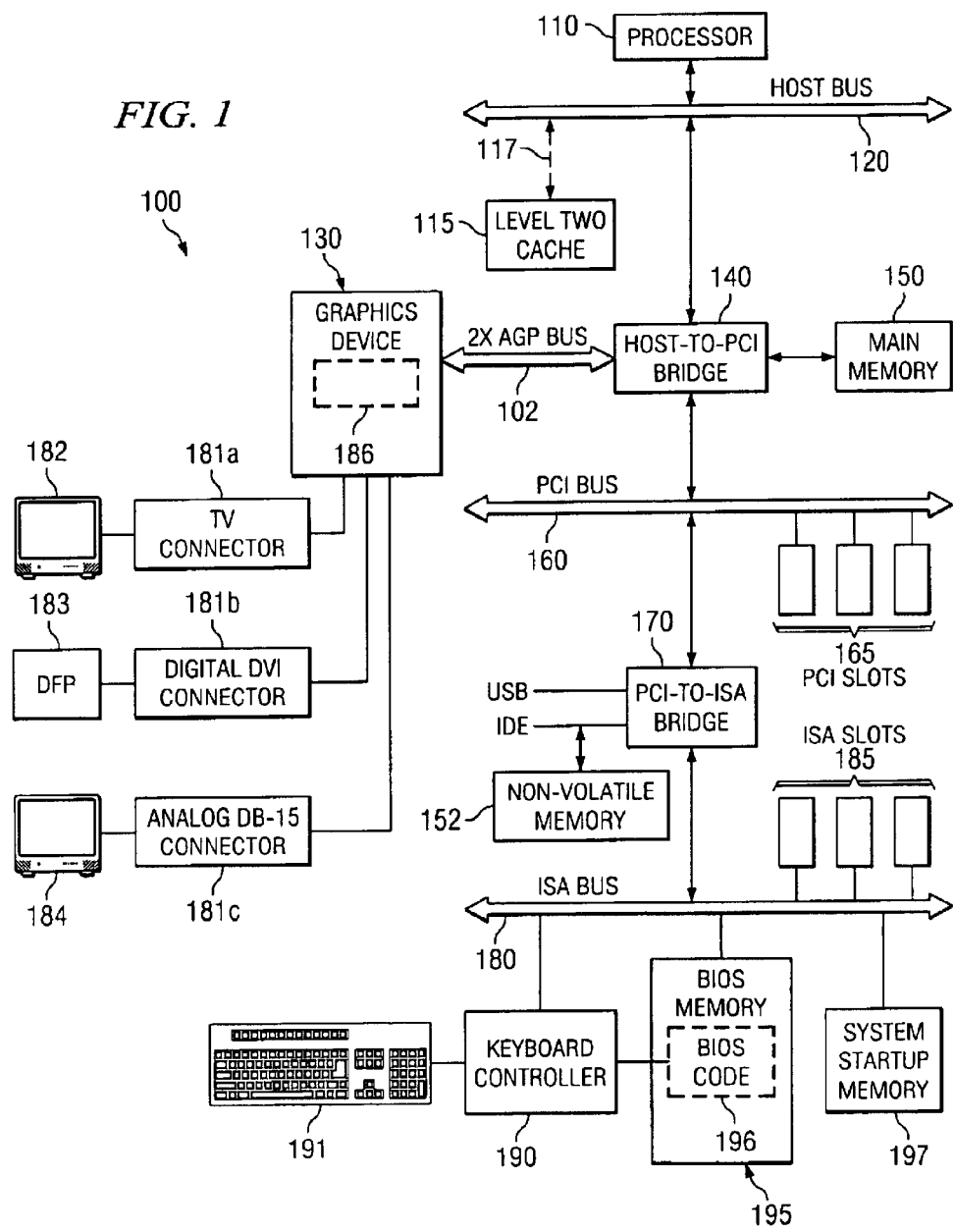
FIG. 1 is block diagram illustrating an exemplary computer system.

FIG. 1 is a block diagram of an exemplary computer system 100. The computer system 100 may be found in many forms including, for example, mainframes, minicomputers, workstations, servers, personal computers, internet terminals, notebooks and embedded systems. Personal computer (PC) systems, such as those compatible with the x86 configuration, include desktop, floor standing, or portable versions. A typical PC computer system 100 is a microcomputer that includes a microprocessor (or simply "processor") 110, associated main memory 150 and control logic and a number of peripheral devices that provide input and output for the system 100. A typical computer system 100 may also include a cache 115 to facilitate quicker access between the processor 110 and main memory 150. The peripheral devices often include speaker systems, keyboards 191, display monitors 184, mouse-type input devices, floppy disk drives, hard disk drives 152, CD-ROM drives, modems, and printers. A typical computer system also includes a system BIOS memory 195 on which the software modules known as the Basic Input/Output System (BIOS) 196 are stored. The BIOS memory 195 is a non-volatile memory, such as ROM or flash memory. The number of I/O devices being added to personal computer systems continues to grow. For example, many computer systems also include network capability, terminal devices, televisions, flat panel displays, sound devices, voice recognition devices, electronic pen devices, and mass storage devices such as tape drives, CD-R drives or DVDs. The peripheral devices usually communicate with the processor over one or more buses 120, 160, 180, with the buses communicating with each other through the use of one or more bridges 140, 170.

FIG. 1 illustrates that the graphics device 130, such as a video controller, communicates with one or more video output connectors 181a, 181b, 181c. One or more output devices 182, 183, 184 may be coupled to the connectors 181a, 181b, 181c, respectively. In at least one embodiment, the output connectors for computer system 100 may include a DB-1 5 connector 181a that is coupled to a traditional analog monitor 184, a DVI (Digital Visual Interface) 181b connector that is coupled to digital flat panel display 183, and/or a television connector 181c, such as a NTSC (National Television Standards Committee) or PAL (Phase Alternating Line) connector, coupled to a television output device 182.

One skilled in the art will recognize that the foregoing components and devices are used as examples for sake of conceptual clarity and that various configuration modifications are common. For example, processor 110 is used as an exemplar of any general processing unit, including but not limited to multiprocessor units; host bus 120 is used as an exemplar of any processing bus, including but not limited to multiprocessor buses; PCI bus 160 is used as an exemplar of any input-output devices attached to any I/O bus; AGP bus 102 is used as an exemplar of any graphics bus; graphics device 130 is used as an exemplar of any graphics controller; and host-to-PCI bridge 140 and PCI-to-ISA bridge 170 are used as exemplars of any type of bridge. Consequently, as used herein the specific exemplars set forth in FIG. 1 are intended to be representative of their more general classes. In general, use of any specific exemplar herein is also intended to be representative of its class, and the non-inclusion of such specific devices in the foregoing list should not be taken as indicating that limitation is desired.

The machine-executed method of the present invention may be performed by one or more executable computer software module(s). Some of the software modules may include BIOS software instructions 196 contained in BIOS memory 195. Other of the modules may include video BIOS software instructions 186 contained in a memory, such as EEPROM, associated with a video controller 130 on a video card. Actual implementation of such computer code 196, 186 might be executable, for example, on a Dell PC based on the Intel 80×86 or Pentium™, microprocessors, such as Dell Dimension™ or Optiplex™ personal computers, or on other suitable processor-based computer systems. The system BIOS code 196 (sometimes referred to herein simply as "the BIOS") contains, among other things, software modules, or "routines", that test the computer system 100. These diagnostics routines, sometimes collectively referred to as the Power On Self Test ("POST"), typically execute when power is supplied the computer system 100.

The video BIOS code 186 ("sometimes referred to herein simply as "the video BIOS") contains, among other things, software modules, or routines, that determine the configuration of the display device(s) connected to the computer system 100. In at least one embodiment, such display devices include one or more of the following: a monitor 184 that accepts RGB (red, green, blue) analog video signals, a television 182, and a digital flat panel display 183. In at least one other embodiment, the display devices may include an analog flat panel display or a dual analog/digital monitor. One skilled in the art will recognize that, in at least one embodiment, the functionality of the system BIOS code 196 and the video BIOS code 186 could be implemented in hardware modules, rather than software modules, or as a combination of both. When implemented as software modules, the present invention includes a computer-readable medium having a computer program accessible therefrom, the computer program including instructions for performing the method of detecting the display device configuration in accordance with the present invention. The computer-readable medium includes any of the following: a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

The system BIOS 196 boots the computer system 100. The system BIOS 196 runs a system POST, then looks for and executes the video card's video BIOS 186. During the system POST diagnostics routines, the BIOS 196 runs through all the known components of the computer system 100—such as the processor 110, the memory 150, the keyboard 191, and so on—to test and determine whether they are operating properly. If the BIOS diagnostics run properly, the system BIOS code 196 then looks for the video card. The system BIOS 196 hands over control to the video card's built-in BIOS routine 186. The system BIOS 196 executes the video BIOS 186, which initializes the video card.

After the system BIOS code 196 executes the video BIOS 186, it executes the Initial Program Load ("IPL"). The IPL begins the process of transferring control of the computer system 100 from the BIOS code 196 to the operating system.

Regarding the system BIOS POST, the general trend has been for the operating system to take over BIOS functions. One reason for this is to allow the end user of the computer system 100 to perceive less delay, when booting up the computer system 100, before the operating system takes over. For instance, the Simple Boot Flag Specification, discussed above, provides for the operating system to take over many of the POST diagnostics tasks traditionally performed by the BIOS. Another example of allowing the operating system to take over BIOS functions is the OnNow initiative, inspired by Microsoft, Inc., which seeks to minimize the delays inherent in starting up and shutting down a personal computer system, and also seeks to let the computer system 100 run while it appears to be off and to lower the overall power requirement of the computer system 100. In order to facilitate power management functions, an integral part of the OnNow initiative is the Advanced Configuration and Power Interface ("ACPI") standard developed jointly by Intel, Microsoft, and Toshiba.

Figure 2:
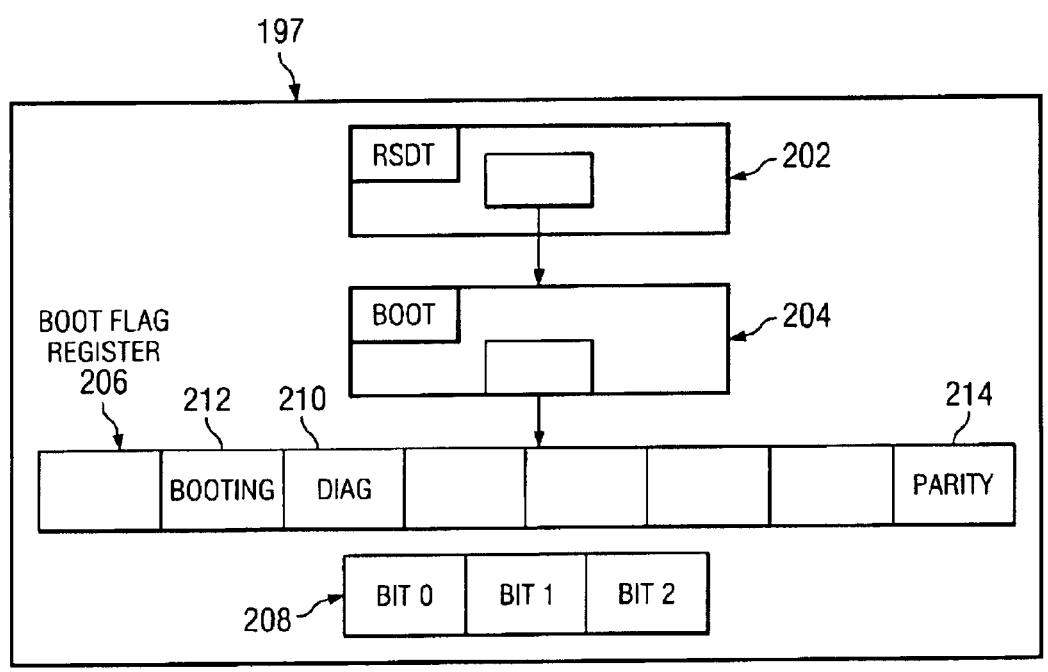
FIG. 2 is a block diagram illustrating a hierarchy of data structures including an ACPI RSDT table, a boot table, and a boot register.

FIG. 2 illustrates that, in order to perform its power management function, the ACPI standard must provide for managing a large amount of data. ACPI provides for storage of this information in a hierarchy of tables. The overall master table is called the Root System Description Table ("RSDT") 202. The RSDT 202 has no fixed place in memory. Rather, the system BIOS 196 locates a pointer to the RSDT table 202 during the memory scan that is part of the boot-up process. The RSDT table 202 itself is defined in memory because it starts with the signature of "RSDT". Following the signature is an array of pointers that indicate the location of other description tables. The SBF spec specifies that one of these tables is called the Boot Table 204.

The Boot table 204 indicates the location of a register, the "boot flag register" 206, used by the BIOS in its performance of the functions specified in the Simple Boot Flag Specification. The boot flag register 206 is a register in the system startup memory 197. The system startup memory 197 is a non-volatile memory containing vital setup information used by the BIOS 196. In at least one embodiment, the system startup memory 197 is a special, small block of battery-backed complementary metal oxide semiconductor ("CMOS") memory. Because CMOS memory is volatile, the battery keeps the system startup memory 197 fresh.

Although the CMOS that holds the system startup memory 197, including the boot flag register 206, is conventional memory, it is not in direct reach of the processor 110 because the system startup memory 197 is I/O mapped. That is, the contents of the boot flag register 206 are accessed through two input/output ports. For example, in an Intel Architecture platform, the system startup memory 197 is accessed through ports 70h and 71h.

The Simple Boot Flag Specification uses the boot flag register to allow the operating system to notify the BIOS when a failure has occurred and thus determine that diagnostic routines need to be executed during the next boot. The goal of this scheme is to run time-consuming BIOS diagnostic routines only when a problem arises, rather than running them a majority of the time. The operating system of the computer system 100 writes to the boot flag register 206 to set options for subsequent boots. The BIOS code 196 reads from the boot flag register 206 during subsequent execution of its boot routine to determine what actions to take. In this manner, an operating system uses the boot flag register 206 to communicate boot options to the BIOS 196. This allows the BIOS 196 to determine whether to run diagnostic tests during boot-up. This scheme is based on the observation that much of boot time is spent running the POST diagnostic routines, and on the further observation that it is not necessary to run these diagnostic routines during every boot-up because modern hardware implementations rarely fail.

The SBF Spec specifies that the operating system utilize the boot register 206 to communicate to the BIOS regarding actions to be taken during the next boot. The format of the boot register 206 is set forth below in Table 1:

TABLE 1

| Bit | Name | Description |
| --- | --- | --- |
| 0 | PNPOS | Indicates that a Plug-and-Play capable operating system is installed on the computer system. |
| 1 | BOOTING | Indicates whether or not the previous boot was completed. |
| 2 | DIAG | Indicates whether or not the BIOS should run full diagnostics. |
| 3–6 | Reserved | Must be 0. |
| 7 | PARITY | Used to check the integrity of the boot register. |

The SBF Spec specifies that the BOOTING indicator 212 is reset by the operating system to indicate when the computer system has successfully booted. The BOOTING indicator 212 is read by the computer system BIOS 196 and the BIOS on any expansion cards to detect failure of a previous boot. The SBF Spec specifies that the system BIOS must check the state of the BOOTING indicator 212 at the beginning of POST. If the BOOTING indicator 212 is in a first state (i.e., it is set), then the system BIOS code 196 sets the DIAG indicator 210 to a first state (i.e., sets the diagnostics indicator 210) to indicate that a full suite of diagnostics routines must be run.

The BOOTING indicator 212 must be set by the BIOS 196 at the earliest possible moment of POST during the current boot. Accordingly, at the earliest possible point in POST, the system BIOS 196 reads the initial values of the BOOTING indicator 212 and the DIAG indicator 210 (Step 1) as configured by the previous boot. The system BIOS 196 then sets the BOOTING indicator to the first state. In at least one embodiment, this sets the BOOTING indicator 212 to a logical value of $1b'1'$. The result of this operation is that the BIOS 196 determines, in Step 1, the values of the BOOTING indicator 212 and the DIAG indicator 210 from the previous boot; the BIOS 196 also indicates, by setting the BOOTING indicator 212, that a current boot has begun.

The diagnostics indicator, DIAG 210, indicates whether or not the system BIOS 196, expansion card BIOSes, and the operating system should, according to the SBF Spec, run diagnostics. If the initial values of the BOOTING 212 or DIAG 210 indicators are determined in Step 1 to be set, then the system BIOS 196 sets the DIAG indicator 210. Otherwise, if both the BOOTING indicator 212 and DIAG indicator 210 are determined to be reset in Step 1, then the system BIOS 196 resets the DIAG indicator 210.

If the DIAG indicator 210 is set, then the system BIOS and the BIOS routines on any expansion cards run full POST diagnostics. Otherwise, if the DIAG indicator 210 is reset, then system BIOS and any expansion card BIOSes skip their diagnostics.

Thereafter, the IPL is executed. If the DIAG indicator 210 is set, the operating system may run its own suite of diagnostic routines. The BOOTING indicator 212 must be cleared by the operating system after the operating system has completed its boot procedure. Accordingly, when the operating system has completed booting, it clears both the BOOTING indicator 212 and the DIAG indicator 210. The operating system also sets the PNPOS and parity bits to the appropriate values at this time.

TABLE 2

| Initial Values (from previous boot) | | Values set by BIOS (for use on current boot) | | Scenario Description |
|---|---|---|---|---|
| BOOTING | DIAG | BOOTING | DIAG | |
| 0 | 0 | 1 | 0 | Previous boot was successful; Skip diagnostics on current boot. |
| 1 | 0 | 1 | 1 | Previous boot unsuccessful (BOOTING never cleared). Run diagnostics on current boot. |
| 0 | 1 | 1 | 1 | Previous boot was successful, but operating system found a problem and requested a diagnostic boot; Run diagnostics on current boot. |
| 1 | 1 | 1 | 1 | The previous boot was unsuccessful and was attempting run diagnostics (i.e., problems with previous two boots); Run diagnostics on current boot. |
| Corrupted | Corrupted | 1 | 1 | PARITY bit indicates the boot register 206 was corrupted. Run diagnostics on current boot. |

The foregoing discussion, which is summarized in Table 2 above, indicates that the Simple Boot Flag Specification specifies that the BOOTING indicator 212 will remain in the first state (set) if the operating system's boot process is interrupted due to a system failure. Conversely, in normal operation with no boot failures, the BOOTING indicator 212 will be in the second (reset) state during the Step 1 evaluation (because it was cleared by the operating system at the end of the previous boot). The DIAG indicator 210 will therefore be reset by the BIOS, and the computer system 100 will boot relatively quickly because no diagnostics will be performed during the current boot.

FIG. 2 illustrates that the present invention implements an additional 3-bit indicator 208 in the CMOS startup memory 197 that is used, in conjunction with the simple boot flag register 206 described above, to speed the display device configuration during the boot process. The 3-bit Simple Boot Flag Display indicator 208, referred to herein as the SBF CRT indicator, indicates the type of display device(s) that were detected during the previous system boot.

FIG. 1 and FIG. 2 illustrate that the SBF CRT indicator 208 indicates whether a monitor 184 (sometimes referred to as a CRT) digital flat panel display 183, or television display device 182 has been detected in connection with one of the computer system's 100 video output connectors 180a, 180b, 180c. Each bit of the SBF CRT indicator 208 corresponds to one of the following display device types: a CRT monitor 184 that displays RGB analog video, a digital flat panel display (DFP) 183 that displays DVI-format video information, and a TV-type output device 182 that displays video information transmitted according to a television broadcast standard such as NTSC or PAL. One skilled in the art will recognize that additional types of output devices, and their combinations and permutations, can easily be accommodated by increasing the bit-count of the SBF CRT indicator 208. At least one embodiment of the format of a 3-bit SBF CRT indicator 208 is set forth below in Table 3.

TABLE 3

| Bit 0-DVI | Bit 1-DB15 | Bit 2-TV out | Displays connected |
|---|---|---|---|
| 0 | 0 | 0 | No display device is connected |
| 0 | 1 | 0 | Only DB15 device is connected |
| 0 | 1 | 1 | Both DB15 and TV devices are connected |
| 1 | 0 | 0 | Only DVI device is connected |
| 1 | 1 | 0 | Both DVI and DB15 devices are connected |
| 1 | 0 | 1 | Both DVI and TV devices are connected |
| 1 | 1 | 1 | DVI, DB15, and TV devices are all connected |

In a computer system 100 that supports the SBF Spec, the video BIOS 186 uses the SBF CRT indicator 208 in combination with the contents of the Boot Flag register 206 to identify which type(s) of output display devices have been connected to the computer system 100.

Figure 3:
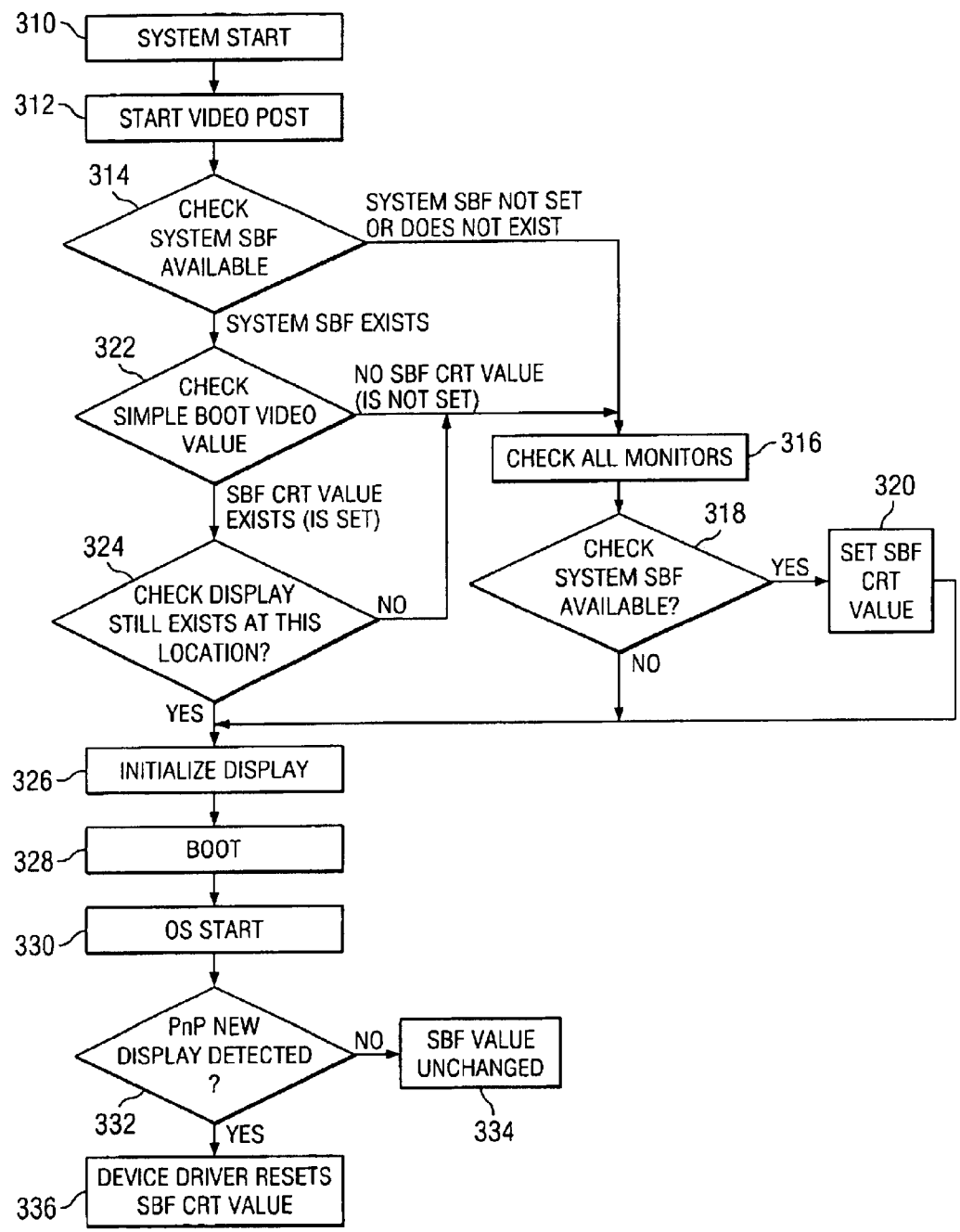
FIG. 3 is a flow chart illustrating at least one embodiment of a method of detecting display device configuration in a computer system.

FIG. 3 is a flow chart illustrating at least one embodiment of a method for detecting display configuration during an SBF fast boot. FIGS. 1 and 3 illustrate that, in operation 310, a system start is initiated when an initiating event is detected. An initiating event is any event that cycles the computer system 100 into a powered-on state. The reset event may be an initial supply of power to a computer system 100 that has been previously in a powered-off state, may be a user-initiated activation of a reset switch, may be a power cycle where power is removed and then restored to a computer system by a user or through an interruption of the power source, may be a software-initiated reset by the operating system, or any other event that causes, or emulates, the computer system's power transitioning from an "off" to "on" state. During the system start operation 310, the initiating event is detected, and execution of the system BIOS code 196 is begun, including execution of POST.

In operation 312 the system BIOS 196 begins execution of the video BIOS 186. Generally, FIG. 3 illustrates that, during an initial boot, the video BIOS 186 runs a full video device detection routine, scanning all possible display connectors 181a, 181b, 181c. However, if the operating system successfully booted during the previous boot routine, then a simplified output device detection scheme is employed. It is therefore necessary for the video BIOS 186 to determine whether the previous boot simple boot was successfully executed. To do so, the video BIOS 186 utilizes the simple boot register 206 (FIG. 2), as is explained below.

FIGS. 2 and 3 illustrate that, in operation 314, the video BIOS 186 determines whether the computer system 100 supports the SBF Spec by determining whether the boot flag register 206 is available in CMOS memory 197. If the boot flag register exists, the video BIOS 186 determines whether the BOOTING 212 and DIAG 210 bits of the boot flag register 206 are reset, indicating that they were reset by the operating system during the previous boot. If both bits 210, 212 are reset, then the video BIOS 186 determines that the computer system 100 supports the SBF Spec and that the previous boot was successful. In such case, the video BIOS 186 then performs operation 322. One skilled in the art will recognize that execution of operation 314 need not be performed if the system is known to support the SBF Spec.

In operation 322, the video BIOS 186 determines whether any of the bits in the SBF CRT indicator 206 is set. In this manner, the video BIOS 186 uses the boot flag register 206 to determine whether the previous boot was successful and, if so, then uses the SBF CRT indicator 208 to determine which output display devices are connected to the computer system 100 without the need to check each output port.

If the video BIOS 186 determines in operation 322 that at least one bit in the SBF CRT indicator 208 is set, this means that one or more video devices were detected during the previous boot. Because the video display configuration may have changed since the previous boot, the video BIOS 186 determines, in operation 324, whether the device(s) indicated by the SBF CRT indicator 208 is still connected to the computer system 100. If the video BIOS 186 detects in operation 324 that the video display configuration has not changed since the last boot, then operation proceeds to operation 326. If, instead, the video BIOS 186 detects in operation 324 that the display device configuration has changed, then a full video detection routine is executed in operation 316, as described below.

Similarly, if the video BIOS 186 determines in operation 322 that none of the SBF CRT indicator's 208 bits are set, then the video BIOS 186 performs operation 316 to query all connectors and thus perform a full video display detection routine. The video BIOS 186 also performs the full video display detection routine in operation 316 if the video BIOS 186 determines in operation 314 that at least one, or both, of the following conditions is true: 1) the SBF CRT indicator 208 does not exist or 2) all bits in the SBF CRT indicator 208 are reset.

After the video BIOS 186 performs the full video display detection routine in operation 316, it knows which video device(s) are connected to the computer system 100 and is in a position to store that information for future boots. Accordingly, the video BIOS 186 determines, in operation 318, if the computer system has a SBF CRT indicator 208. If so, the video BIOS 186 modifies the appropriate bit(s) in the SBF CRT indicator 208 to indicate which video device(s) are connected to the computer system 100. For instance, the bits of the SBF CRT indicator 208 will be modified to reflect the detected devices, as is set forth in Table 3, above. If the video BIOS 186 determines in operation 318 that the computer system 100 does not have a SBF CRT indicator 208, the video BIOS 186 then executes operation 326.

In operation 326, the video BIOS 186 initializes the detected display device(s). During this initialization step, for instance, the video BIOS 186 determines how much memory the video card contains. In at least one embodiment, a display regarding information about the video card is displayed to the output device during the initialization operation 326.

After initializing the display device, the video BIOS 186 transfers control back to the system BIOS 196, which performs the remainder of the system boot process in operation 328. It is in operation 328 that the system BIOS 196 performs the IPL. Operation 330 is then performed.

In operation 330, the operating system assumes control of the computer system 100 and performs additional boot process functions, such as performing the resetting of the bits in the simple boot flag register 206 as described above.

In operation 332, the operating system, if it supports the Plug and Play capability, detects Plug and Play (PnP) devices. Intel and Microsoft set the Plug and Play capability forth in the PC98 System Design Guide, version 0.9. Generally, an operating system that supports Plug and Play capability detects and configures peripheral devices. In a computer system with an operating system that does not support Plug and Play, the system BIOS 196, rather than the operating system, must configure the resources of all the peripheral devices it controls. The system BIOS 196 uses bit 0 of the boot flag register 206 to determine whether a Plug-and-Play-capable operating system is installed on the computer system 100. If bit 0 (PNPOS) is set, then the system BIOS 196 assumes a Plug and Play operating system and therefore only configures devices required for the boot process as required by the PC98 Specification. (The operating system sets the PNPOS bit on every boot so that the system BIOS 196 can detect it during the next boot).

In such case, the operating system determines in operation 332 whether a new Plug and Play video display device has been detected. In other words, the operating system determines whether a Plug and Play video device that is not reflected in the SBF CRT indicator 208 has been detected. If so, the operating system's device driver for the Plug and Play video device resets the appropriate SBF CRT 208 bit to reflect that the change in Plug and Play video devices has been detected. This processing is necessary to correctly detect and note the existence of video display devices when some devices (i.e., Plug and Play) devices will not be detected by the system BIOS 196 but will, instead, be detected by the operating system.

If the operating system does not detect new Plug and Play video display devices in operation 332, then the operating system allows the SBF CRT indicator's 208 value to remain unchanged in operation 334.

Alternative Embodiments

While particular embodiments of the present invention have been shown and described, it will be recognized to those skilled in the art that, based upon the teachings herein, further changes and modifications may be made without departing from this invention and its broader aspects and, thus, the appended claims are to encompass within their scope all such changes and modifications as are within the true spirit and scope of the invention.

For example, the SBF CRT indicator 208 is implemented, in at least one embodiment, in a computer system 100 that does not support the SBF Spec. In such embodiment, an alternative method of determining the video device configuration, rather than using the simple boot flag register 206, is used to determine which bits of the SBF CRT indicator 208 should be set.

Also, for example, the software routines discussed above can be implemented in software, hardware, or a combination thereof.

Also, for example, the execution of operation 314 can be modified, in at least one embodiment, when the computer system 100 is known to support the SBF Spec. In such case, the video BIOS 186 need only determine whether any bits in the SBF CRT indicator 208 are set, without first confirming that the SBF CRT indicator 208 exists.

Also, for example, a full video display detection routine may include the processing of operations 318 and 320. That is, the same module checks all display ports and sets the appropriate bit(s) in the SBF CRT indicator 208.

We claim:

1. A method of detecting the display device configuration in a computer system, comprising:

determining whether a previous system boot was successful by accessing a booting indicator;

if the previous system boot was successful, accessing a CRT indicator to determine a previous display device configuration;

determining whether the previous display device configuration has been modified; and modifying the CRT indicator to reflect a current display device configuration if the previous display device configuration has been modified.

2. The method of claim 1, wherein:

the modifying the indicator further comprises modifying the CRT indicator to reflect a current display device configuration that includes one or more plug-and-play devices.

3. The method of claim 1, wherein:

the determining whether a previous system boot was successful further comprises determining the contents of a simple boot flag register.

4. The method of claim 1 further comprises:

initializing one or more display devices.

5. The method of claim 1 further comprises:

determining whether a simple boot flag register is available; and performing, if the simple boot flag register is not available, a full video display detection routine.

6. A computer system that detects display device configuration, comprising:

a processor;

a memory coupled to the processor;

a module that determines whether a previous system boot was successful using a booting indicator;

a module that accesses a CRT indicator to determine a previous display device configuration, if the previous system boot was successful;

a module that determines whether the previous display device configuration has been modified; and a module that modifies the indicator to reflect a current display device configuration if the previous display device configuration has been modified.

7. The system of claim 6, wherein:

the module that modifies the indicator further comprises a module that modifies the CRT indicator to reflect a current display device configuration that includes one or more plug-and-play devices.

8. The system of claim 6, wherein:

the module that determines whether a previous system boot was successful further comprises a module that determines the contents of a simple boot flag register.

9. The system of claim 6 further comprises:

a module that initializes one or more display devices.

10. The system of claim 6 further comprises:

a module that determines whether a simple boot flag register is available; and a module that performs, if the simple boot flag register is not available, a full video display detection routine.

11. A computer-readable medium having a computer program accessible therefrom, the computer program comprising one or more instructions for:

determining whether a previous system boot was successful using a booting indicator;

if the previous system boot was successful, accessing a CRT indicator to determine a previous display device configuration;

determining whether the previous display device configuration has been modified; and modifying the indicator to reflect a current display device configuration if the previous display device configuration has been modified.

12. The computer-readable medium of claim 11, wherein the computer readable medium includes any of a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

13. The computer-readable medium as recited in claim 11, wherein the one or more instructions for modifying the indicator further comprise one or more instructions for modifying the CRT indicator to reflect a current display device configuration that includes one or more plug-and-play devices.

14. The computer-readable medium as recited in claim 11, wherein the one or more instructions for determining whether a previous system boot was successful further comprise one or more instructions for determining the contents of a simple boot flag register.

15. The computer-readable medium as recited in claim 11, wherein the computer program further includes one or more instructions for initializing one or more display devices.

16. The computer-readable medium as recited in claim 11, wherein the computer program further includes instructions for:

determining whether a simple boot flag register is available; and performing, if the simple boot flag register is not available, a full video display detection routine.

* * * * *